(12) United States Patent
Zhang

(10) Patent No.: US 12,490,818 B2
(45) Date of Patent: Dec. 9, 2025

(54) HOLDER ASSEMBLY AND CONNECTING MEMBER

(71) Applicant: SHENZHEN ZHANGLA INNOVATION TECHNOLOGY CO., LTD., Guangdong (CN)

(72) Inventor: Bo Zhang, Guangdong (CN)

(73) Assignee: SHENZHEN ZHANGLA INNOVATION TECHNOLOGY CO., LTD., Guangdong (CN)

( * ) Notice: Subject to any disclaimer, the term of this patent is extended or adjusted under 35 U.S.C. 154(b) by 76 days.

(21) Appl. No.: 18/710,054

(22) PCT Filed: Jul. 28, 2022

(86) PCT No.: PCT/CN2022/108677
§ 371 (c)(1),
(2) Date: May 14, 2024

(87) PCT Pub. No.: WO2023/087776
PCT Pub. Date: May 25, 2023

(65) Prior Publication Data
US 2025/0009093 A1  Jan. 9, 2025

(30) Foreign Application Priority Data

Nov. 17, 2021 (CN) .......................... 202111362536.4
Nov. 17, 2021 (CN) .......................... 202122826352.0
(Continued)

(51) Int. Cl.
*A45C 11/00* (2006.01)
*H04M 1/04* (2006.01)

(52) U.S. Cl.
CPC .............. *A45C 11/00* (2013.01); *H04M 1/04* (2013.01); *A45C 11/002* (2025.01)

(58) Field of Classification Search
CPC ........ A45C 11/00; A45C 11/002; H04M 1/04; F16M 11/04
See application file for complete search history.

(56) References Cited

U.S. PATENT DOCUMENTS 6,540,049 B1 * 4/2003 Ring ...................... B61H 13/04
192/16
8,498,102 B2 * 7/2013 Holman, IV .......... G06F 1/1681
361/679.01
(Continued)

FOREIGN PATENT DOCUMENTS

CN      101925313 A      12/2010
CN      203702759 U       7/2014
(Continued)

*Primary Examiner* — Amy J. Sterling
(74) *Attorney, Agent, or Firm* — Brooks Kushman P.C.

(57) ABSTRACT

A holder assembly including a connecting member and the holder body including a connecting portion, a mounting portion, a first magnetic member, and a movable member, the first magnetic member is fixed relative to the connecting portion, and the movable member is movable relative to the connecting portion; the mounting portion is configured to fixedly connect the first component, and the connecting portion is connected with the mounting portion; at least part of the movable member always has a tendency to switch from the first position to the second position; when the connecting member is engaged with the connecting portion, the connecting member drives the movable member to switch from the second position to the first position; and when the connecting member and the connecting portion are engaged in place, the at least part of the movable member is switched from the first position to the second position.

20 Claims, 7 Drawing Sheets

(30)  Foreign Application Priority Data

Nov. 17, 2021 (CN) .......................... 202122837385.5
Dec. 2, 2021 (CN) .......................... 202123011434.6

(56)  References Cited

U.S. PATENT DOCUMENTS

| | | |
|---|---|---|
| 2013/0303000 A1 | 11/2013 | Witter et al. |
| 2014/0360893 A1 | 12/2014 | Whitten et al. |
| 2016/0308571 A1 | 10/2016 | Chiang et al. |
| 2019/0281960 A1 | 9/2019 | Peterson et al. |
| 2024/0219970 A1* | 7/2024 | Backus ................ F16M 11/041 |
| 2024/0333828 A1* | 10/2024 | Yeo ..................... H04M 1/0281 |
| 2025/0211662 A1* | 6/2025 | Tang .................... H04M 1/026 |

FOREIGN PATENT DOCUMENTS

| | | |
|---|---|---|
| CN | 206894737 U | 1/2018 |
| CN | 207218819 U | 4/2018 |
| CN | 110985837 A | 4/2020 |
| CN | 211146032 U | 7/2020 |
| CN | 211203535 U | 8/2020 |
| CN | 212305420 U | 1/2021 |
| CN | 112968987 A | 6/2021 |
| CN | 213547591 U | 6/2021 |
| CN | 214248779 U | 9/2021 |
| CN | 214380308 U | 10/2021 |
| CN | 114165684 A | 3/2022 |
| CN | 216520464 U | 5/2022 |
| CN | 216520466 U | 5/2022 |
| CN | 216715657 U | 6/2022 |
| JP | 2011256906 A | 12/2011 |
| JP | 2013087862 A | 5/2013 |

\* cited by examiner

HOLDER ASSEMBLY AND CONNECTING MEMBER

CROSS REFERENCE TO RELATED APPLICATIONS

The present application is a National Stage Appl. filed under 35 USC 371 of International Patent Application No. PCT/CN2022/108677 with an international filing date of Jul. 28, 2022, designating the United States, and claims priorities of a Chinese Patent Application, with application No. 202122837385.5, filed on Nov. 17, 2021; a Chinese Patent Application, with application No. 202122826352.0, filed on Nov. 17, 2021; a Chinese Patent Application, with application No. 202123011434.6, filed on Dec. 2, 2021; and a Chinese Patent Application, with application No. 202111362536.4, filed on Nov. 17, 2021; the contents of which are incorporated herein by reference.

TECHNICAL FIELD

The present application relates to technical field of holders, and specifically to a holder assembly and a connecting member.

BACKGROUND

In order to facilitate use, mobile phones, tablets and other electronic devices often need to be used with fixing holders. The traditional fixing holder is roughly divided into two types: a magnetic type and a clamping type. When the clamping type holder is used, it is generally necessary to move the electronic device above the holder, and then place electronic device on the holder from top to bottom. That is to say, when the existing clamping type holder is used, the user needs to go through two steps to mount the electronic device onto the holder, and the operation is more complicated.

SUMMARY

One of objects of embodiments of the present application is to provide a holder assembly and a connecting member, which aims to solve the issues that the user needs to go through two steps to mount the electronic device onto the holder, and the operation is more complicated.

In order to solve above technical issues, it is necessary to provide a holder assembly with simpler operation, and it is further necessary to provide a connecting member for directly or indirectly connecting the electronic device.

The technical solution adopted in an embodiment of the present application is that:

In a first aspect, an object of the present application is to provide a holder assembly, which includes a holder body and a connecting member; the holder body is configured for fixing to a first component and the connecting member is configured for fixing to a second component;

the holder body comprises: a connecting portion, a mounting portion, and a movable member; at least part of the movable member is movable relative to the connecting portion, the mounting portion is configured for fixedly connecting the first component, the connecting portion is connected with the mounting portion, and the connecting portion is configured for engaging with the connecting member, so as to connect the first component with the second component;

the at least part of the movable member is provided with a first position and a second position, the at least part of the movable member is capable of being switched between the first position and the second position, and the at least part of the movable member always has a tendency to switch from the first position to the second position; and the first position avoids an engagement path where the connecting member is engaged with the connecting portion, and the second position is in the engagement path where the connecting member is engaged with the connecting portion; when the connecting member is engaged with the connecting portion along the engagement path, the connecting member presses against the at least part of the movable member and drives the at least part of the movable member to switch from the second position to the first position; and when the connecting member and the connecting portion are engaged in place, the at least part of the movable member is switched from the first position to the second position, so as to prevent the connecting member from being detached from the connecting portion in a direction opposite to the engagement path.

In an embodiment, the holder assembly further includes a first magnetic member fixed relative to the connecting portion, the movable portion and the first magnetic member are magnetically attracted, and all of the movable portion always has the tendency to switch from the first position to the second position under a magnetic force of the first magnetic member.

In an embodiment, the movable member is provided with an elastic portion, and the elastic portion always has a deformation from the first position to the second position, and then has tendency to switch from the first position to the second position.

In an embodiment, the connecting member is provided with a locking portion and an unlocking portion, and the locking portion and the unlocking portion are successively arranged along a circumferential direction and are smoothly connected to each other; the locking portion comprises an internal concave structure that is recessed from a part of a circumferential surface of the connecting member to a center of the connecting member, and the unlocking portion comprises other part of the circumferential surface of the connecting member;

the connecting member is capable of rotating relative to the connecting portion, and the connecting member is provided with a locking position and an unlocking position; when the connecting member is in the locking position, the connecting member is capable of rotating relative to the connecting portion within a preset angel, and when the connecting member is in the unlocking position, the connecting member is detached from the connecting portion;

When the movable potion is switched from the first position to the second position under the magnetic force of the first magnetic member, the movable portion is accommodated in the locking portion, and the connecting member is in the locking position;

when the connecting member rotates relative to the connecting portion and exceeds the preset angle, the unlocking portion presses against the first magnetic member along the circumferential direction of the connecting member, and drives the movable member to switch from the second position to the first position, so as to be detached from the locking portion, and the connecting member is in the unlocking position; and the engagement path where the connecting member is engaged with the connecting portion is perpendicular to the circumferential direction of the connecting member.

In an embodiment, the holder assembly includes at least a pair of movable portions, and two movable portions of the pair of movable portions are arranged opposite to each other and are respectively arranged at two sides of the engagement path; the connecting member is provided with at least a pair of locking portions and at least a pair of unlocking portions, two locking portions of the pair of locking portions are arranged opposite to each other and are respectively arranged at two sides of the engagement path, and two unlocking portions of the pair of unlocking portions are arranged opposite to each other and are respectively arranged at two sides of the engagement path; the locking portions and the unlocking portions are alternately arranged along the circumferential direction of the connecting member, and adjacent locking portion and the unlocking portion are smoothly connected; and the pair of locking portions are configured for synchronously accommodating the pair of movable portions, and the pair of unlocking portions are configured for synchronously driving the pair of movable portions to switch from the second position to the first position.

In an embodiment, an extension length of the locking portion is greater than an extension length of the movable portion along a circumferential direction of the connecting member, so that when the connecting member is in the locking position, the connecting member is rotated relative to the connecting portion within the preset angle.

In an embodiment, a side of the connecting portion away from the mounting portion is provided with a mounting groove, the first magnetic member is embedded inside a bottom of the mounting groove, and the movable portion is movably arranged on an inner side wall of the mounting groove; the movable portion is capable of approaching or moving away from a central axis of the mounting groove, the first position is a position away from the central axis, and the second position is a position approaching the central axis; and the engagement path where the connecting member is engaged with the connecting portion is parallel to the central axis;

a side of the connecting member facing the connecting portion is provided with a mounting protrusion, and a side of the connecting member away from the connecting portion is provided with the locking position and the unlocking position; and when the connecting member and the connecting portion are engaged along the engagement path, the mounting protrusion presses against the movable portion and drives the movable portion to switch from the second position to the first position; when the mounting protrusion is fully adapted to the mounting groove, the connecting member and the connecting portion are engaged in place, and the movable portion is switched from the first position to the second position under the magnetic force of the first magnetic member, and is accommodated in the locking portion.

In an embodiment, the bottom of the mounting groove is provided with a geometric center, and the holder body comprises at least a pair of first magnetic members, and the pair of first magnetic members are symmetrically arranged about the geometric center; the holder body comprises at least a pair of movable portions, and two movable portions of the pair of movable portions are arranged opposite to each other and are respectively arranged at two sides of the central axis; and the pair of first magnetic members are configured for synchronously acting on the pair of movable portions.

In an embodiment, the holder body includes two pairs of the first magnetic members, and an angle between a connection line of one pair of first magnetic members and a connection line of another one pair of first magnetic members is 90°; the holder body comprises two pairs of the movable portions, and an angle between a connection line of one pair of movable portions and a connection line of another one pair of movable portions is 90°; and the two pairs of the first magnetic members and two pairs of the movable members are configured for engaging the connecting portion at different angles 90° apart from the holder body.

In an embodiment, at least a pair of second magnetic members are provided inside the connecting member, the pair of second magnetic members are arranged opposite to the pair of first magnetic members along the engagement path, and the second magnetic members are configured for magnetically attracting with the first magnetic members.

In an embodiment, the inner side wall of the inner side wall of the mounting groove is provided with a first sliding groove and a second sliding groove, and the first sliding groove and the second sliding groove are arranged at intervals along a circumferential direction of the inner side wall of the mounting groove; the first sliding groove and the second sliding groove are respectively provided with a depth along a thickness direction of a side wall of the mounting groove, the first sliding groove and the second sliding groove are configured for slidingly mounting two ends of the movable portion; and when the movable member slides relative to the first sliding groove and the second sliding groove, the movable member approaches or moves away from the central axis.

In an embodiment, along a direction from the connecting member towards to the connecting portion, an outer side wall of the mounting protrusion is a conical surface gradually approaching to the central axis, and the inner side wall of the mounting groove is a conical surface gradually approaching to the central axis.

In a second aspect, a further object of the present application is to provide a connecting member, an end of the connecting member is configured for connecting an electronic device, and the other end of the connecting member opposite to the end is provided with a mounting protrusion; and circumferential surfaces of the end and the other end of the connecting member are respectively provided with a locking portion and an unlocking portion, and the locking portion and the unlocking portion are successively arranged along a circumferential direction of the connecting member and are smoothly connected to each other; the locking portion comprises an internal concave structure recessed by a part of a circumferential surface of the connecting member toward a center of the connecting member, and the unlocking portion comprises other part of the circumferential surface of the connecting member.

In an embodiment, the connecting member is provided with at least a pair of locking portions and at least a pair of unlocking portions, two locking portions of the pair of locking portions are arranged opposite to each other and are respectively arranged at two sides of the engagement path, and two unlocking portions of the pair of unlocking portions are arranged opposite to each other and are respectively arranged at two sides of the engagement path; the locking portions and the unlocking portions are alternately arranged along the circumferential direction of the connecting member, and adjacent locking portion and the unlocking portion are smoothly connected; and an extension length of the locking portion is greater than an extension length of the unlocking portion along a circumferential direction of the connecting member.

In an embodiment, the mounting protrusion is a ring structure, and an outer side wall of the mounting protrusion is a conical surface gradually approaching to a central axis of the mounting protrusion in a direction from the end towards the other end.

In an embodiment, the connecting member further includes a protective shell for being sleeved onto the electronic device, and the protective shell is arranged on the end.

In an embodiment, the end of the connecting member is coated with an adhesive layer, and the adhesive layer is configured for bonding a shell of the electronic device or a protective shell of the electronic device.

The beneficial effects of the holder assembly provided by embodiments of the present application are:

When using the holder assembly provided in present application, it is only needed to push the electronic device mounted with the connecting member provided in the present application directly against the holder body, and the process of pushing is the process of engagement. During the process, the connecting member presses against at least part of the movable member on the holder body, and drives the at least part of the movable member to switch from the second position to the first position, thereby avoiding the engagement path of the connecting member to be engaged into the holder body. When the connecting member and the connecting portion are engaged in place, the at least part of the movable member is re-switched from the first position to the second position, at this time, since the connecting member has been engaged in the connecting portion, the at least part of the movable member is restored to the second position, which can prevent the connecting member from separating from the connecting portion in the direction opposite to the engagement path, and the at least part of the movable member is forced to move to form an avoidance; and the at least part of the movable member is actively restored to form locking. This process can be completed by a one-time pushing of the user, so as to realize the connection between the shell of the electronic device or the protective shell of the electronic device and the holder body. Compared with the traditional clamping type holder, when using the holder assembly provided in the present application, the user only needs one step to realize the mounting of limiting angle, and the operation is simple and fast.

The beneficial effects of the connecting member provided by embodiments of the present application are summarized as follows:

When using the connecting member provided in present application, it is only needed to fit the connecting member with the holder assembly provided in the present application, then the electronic device mounted with the connecting member provided in the present application is pushed directly against the holder body, and the process of pushing is the process of engagement. During the process, the connecting member presses against at least part of the movable member on the holder body, and drives the at least part of the movable member to switch from the second position to the first position, thereby avoiding the engagement path of the connecting member to be engaged into the holder body. When the connecting member and the connecting portion are engaged in place, the at least part of the movable member is re-switched from the first position to the second position, at this time, since the connecting member has been engaged in the connecting portion, the at least part of the movable member is restored to the second position, which can prevent the connecting member from separating from the connecting portion in the direction opposite to the engagement path, and the at least part of the movable member is forced to move to form an avoidance; and the at least part of the movable member is actively restored to form locking. This process can be completed by a one-time pushing of the user, so as to realize the connection between the shell of the electronic device or the protective shell of the electronic device and the holder body. Compared with the traditional clamping type holder, when using the holder assembly provided in the present application, the user only needs one step to realize the mounting of limiting angle, and the operation is simple and fast.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION OF EMBODIMENTS

Figure 1:
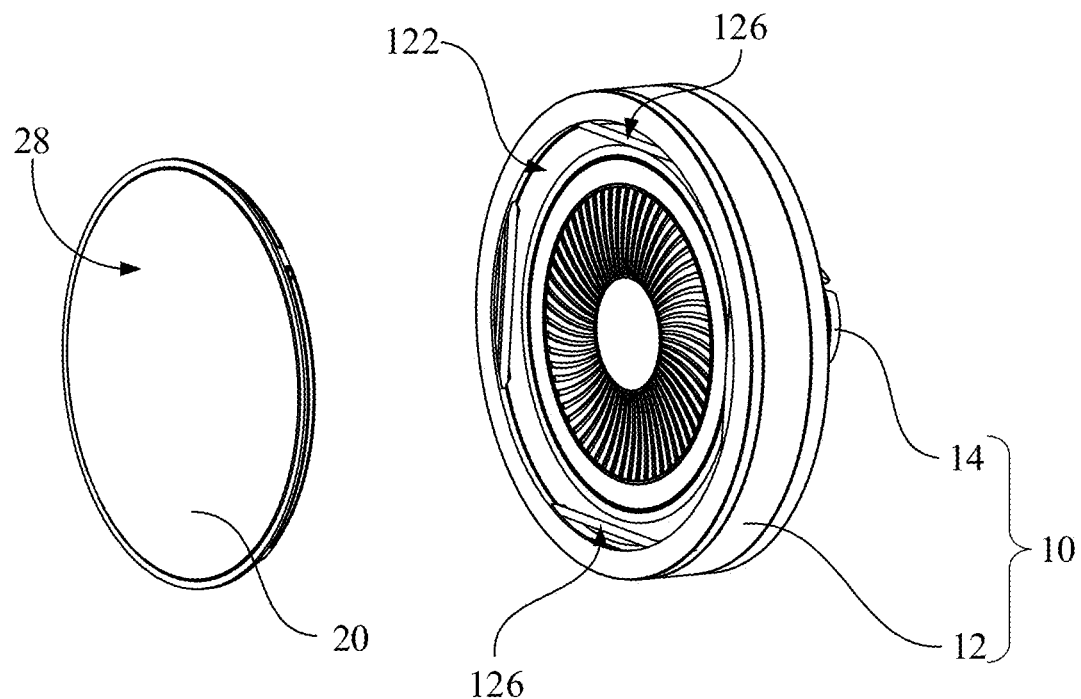
FIG. 1 is a structural schematic view of a holder assembly provided by an embodiment of the present application.
Figure 2:
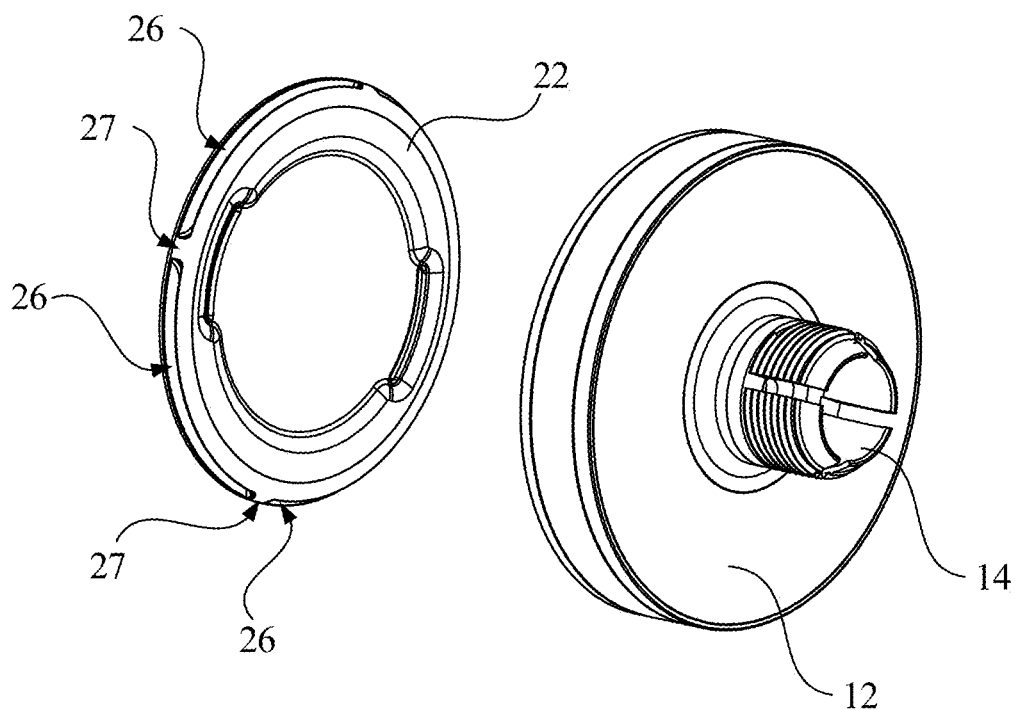
FIG. 2 is a structural schematic view of a holder assembly provided by an embodiment of the present application; where the views in FIG. 1 and FIG. 2 are in opposite directions.

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component. Terms "the first" and "the second" are only used in describe purposes, and should not be considered as indicating or implying any relative importance, or impliedly indicating the number of indicated technical features. "A plurality of" means two or more, unless there is additional explicit and specific limitation.

In order to illustrate the technical solution provided in the present application, the following are detailed in combination with specific drawings and embodiments. It should be noted that in the embodiment, FIGS. 1 to 4 are the structural schematic views of a holder assembly provided by one embodiment, and FIGS. 6 to 11 are the structural schematic views of a holder assembly provided by another embodiment.

As shown in FIGS. 1 to 3 and FIGS. 6 to 9, the holder assembly provided in the embodiment of the present application includes a holder body 10 and a connecting member 20, the holder body 10 is configured for fixing onto the first component and the connecting member 20 is configured for fixing onto the second component. The first component can be a support platform, such as a fixing support platform, or a vehicle support platform, or a support platform arranged at the end of the support rod, or a wearable support platform, where the holder body 10 can be mounted onto any support platform. The second component can be a shell for the electronic device, or the second component can be a protective shell for the electronic device.

As shown in FIG. 1, FIG. 2, FIG. 8 and FIG. 9, the holder body 10 includes a connecting portion 12, a mounting portion 14, and a first magnetic member 124 and a movable member 126. The first magnetic member 124 is fixed relative to the connecting portion 12, and the movable member 126 is movable relative to the connecting portion 12. The mounting portion 14 is configured for fixedly connecting of the first component, the connecting portion 12 is connected with the mounting portion 14, and the connecting portion 12 is configured for engaging with the connecting member 20 to connect the first component and the second component.

In the embodiment of the present application, the mounting portion 14 is preferably connected to the support platform by a threaded connecting member 20. In other embodiments, the mounting portion 14 can also be a fixing seat or a clamping portion, connected to the first component by engaging or clamping.

The movable member 126 is provided with a first position and a second position, and the movable member 126 can switch between the first position and the second position; the movable member 126 always has a tendency to switch from the first position to the second position under the magnetic force of the first magnetic member 124.

The first position avoids an engagement path between the connecting member 20 and the connecting portion 12, and the second position is in the engagement path where the connecting member 20 is engaged with the connecting portion 12; when the connecting member 20 is engaged with the connecting portion 12 along the engagement path, the connecting member 20 presses against the at least part of the movable member 126 and drives the at least part of the movable member 126 to switch from the second position to the first position; and when the connecting member 20 and the connecting portion 12 are engaged in place, the at least part of the movable member 126 is switched from the first position to the second position, so as to prevent the connecting member 20 from being detached from the connecting portion 12 in a direction opposite to the engagement path.

In the embodiment, the holder body 10 also includes a first magnetic member 124, which is fixed relative to the connecting portion 12, and the movable member 126 and the first magnetic member 124 can be magnetically attracted, and all of the movable portion 126 always has the tendency to switch from the first position to the second position under a magnetic force of the first magnetic member 124.

In another embodiment, the holder body 10 includes a connecting portion 12, a mounting portion 14, and a movable member 126, at least part of the movable member 126 is movable relative to the connecting portion 12, the mounting portion 14 is configured for fixedly connecting the first component, the connecting portion 12 is connected with the mounting portion 14, and the connecting portion 12 is configured for engaging with the connecting member 20, so as to connect the first component with the second component.

At least part of the movable member 126 is provided with a first position and a second position, the at least part of the movable member 126 is capable of being switched between the first position and the second position, and the at least part of the movable member 126 always has a tendency to switch from the first position to the second position.

In the embodiment, the movable member is provided with an elastic portion, and the elastic portion always has a deformation from the first position to the second position, and then has tendency to switch from the first position to the second position.

The first position avoids an engagement path between the connecting member 20 and the connecting portion 12, and the second position is in the engagement path where the connecting member 20 is engaged with the connecting portion 12; when the connecting member 20 is engaged with the connecting portion 12 along the engagement path, the connecting member 20 presses against the movable member 126 and drives the elastic portion to switch from the second position to the first position; and when the connecting member 20 and the connecting portion 12 are engaged in place, the elastic portion is switched from the first position to the second position through the elastic force, so as to prevent the connecting member 20 from being detached from the connecting portion 12 in a direction opposite to the engagement path.

In the embodiment of the present application, the connecting member 20 is provided with a locking portion 26 and unlocking portion 27, and the locking portion 26 and unlocking portion 27 are successively arranged along a circumferential direction of the connecting member 20 and the locking portion 26 and unlocking portion 27 are smoothly connected; the locking portion 26 includes an internal concave structure that is recessed from a part of a circumferential surface of the connecting member 20 to a center of the connecting member 20, that is, the position where the locking portion 26 toward the central axis of the connecting member 20 avoids a certain space for containing the movable member 126. The unlocking portion 27 includes other part of the circumferential surface of the connecting member 20, which is not concave towards the position where the central axis of the connecting member 20 is located, therefore, the other part of the circumferential surface of the connecting member 20 is located radially outside the locking portion 26 and can provide a radially outward force to press the movable member 126.

After the connecting member 20 is engaged into the connecting portion 12, the connecting member 20 can rotate relative to the connecting portion 12, and the connecting member 20 is provided with a locking position and an unlocking position; when the connecting member 20 is in the locking position, the connecting member 20 can rotate relative to the connecting portion 12 within a preset angel, and when the connecting member 20 is in the unlocking position, the connecting member 20 is detached from the connecting portion 12.

When the movable potion 126 is switched from the first position to the second position under the magnetic force of the first magnetic member 124, the movable portion 126 is accommodated in the locking portion 26, and the connecting member 20 is in the locking position; when the connecting member 20 rotates relative to the connecting portion 12 and exceeds the preset angle, the unlocking portion 27 presses against the first magnetic member 124 along the circumferential direction of the connecting member 20, and drives the movable member 126 to switch from the second position to the first position, so as to be detached from the locking portion 26, and the connecting member 20 is in the unlocking position; and the engagement path where the connecting member 20 is engaged with the connecting portion 12 is perpendicular to the circumferential direction of the connecting member 20.

In the holder assembly provided by the embodiment of the present application, the user only needs to turn the shell of the electronic device mounted with connecting member 20 or the protective shell of the electronic device to force the unlocking portion 27 to be pressed against the movable member 126, since the position of the unlocking portion 27 in the radial direction is further outside the second position of the movable member 126. Therefore, the movable member 126 can be driven to switch from the second position to the first position, so that the movable member 126 slides out from the locking portion 26, thus the unlocking of the connecting member 20 is realized.

As can be seen from the above, when locking the holder assembly provided in the present application, the user only needs to push the holder assembly in one step to realize the mounting in a limiting angle, and the operation is simple and fast. When unlocking the holder assembly, the user only needs to turn the shell of the electronic device mounted with the connecting member 20 or the protective shell of the electronic device, so as to drive the unlocking portion 27 to press against the movable member 126, so that the movable member 126 slides out from the locking portion 26, so as to achieve a one-step rotary unlock.

In the embodiment of the present application, an extension length of the locking portion 26 is greater than an extension length of the movable portion 126 along a circumferential direction of the connecting member 20, so that when the connecting member 20 is in the locking position, the connecting member 20 is rotated relative to the connecting portion 12 within the preset angle.

In embodiments of the present application, the connecting member 20 is optionally rotably engaged to the connecting portion 12, that is, when the connecting member 20 and connecting portion 12 are engaged in place, the connecting member 20 can be rotated at a preset angle relative to the connecting portion 12. In other embodiments, after the connecting member 20 is engaged to the connecting portion 12, the connecting member 20 and the connecting portion 12 are relatively fixed. In the embodiment, the rotation angle of the connecting member 20 depends on the extension length of the locking portion 26 described below. The longer the extension length of the locking portion 26 along the circumferential direction of the connecting member 20, the greater the rotation angle of the connecting member 20 with respect to the connecting portion 12 on the premise that the connecting member 20 is engaged to the connecting portion 12. Conversely, the extension length of the locking portion 26 along the circumferential direction of the connecting member 20 just limits the movable member 126 to a preset position, and the connecting member 20 is engaged to the connecting portion 12, that is, the connecting member 20 is fixed relative to the connecting portion 12.

As shown in FIGS. 3 and 4, and FIGS. 6 to 9, the holder assembly 10 includes at least a pair of movable portions 126, and two movable portions 126 of the pair of movable portions 126 are arranged opposite to each other and are respectively arranged at two sides of the engagement path; the connecting member 20 is provided with at least a pair of locking portions 26 and at least a pair of unlocking portions 27, two locking portions 26 of the pair of locking portions 26 are arranged opposite to each other and are respectively arranged at two sides of the engagement path, and two unlocking portions 27 of the pair of unlocking portions 27 are arranged opposite to each other and are respectively arranged at two sides of the engagement path; the locking portions 26 and the unlocking portions 27 are alternately arranged along the circumferential direction of the connecting member 20, and adjacent locking portion 26 and the unlocking portion 27 are smoothly connected; and the pair of locking portions 26 are configured for synchronously accommodating the pair of movable portions 126, and the pair of unlocking portions 27 are configured for synchronously driving the pair of movable portions 126 to switch from the second position to the first position. The plurality of pairs of movable members 126, locking portions 26 and unlocking portions 27 can help the user achieving multi-angle locking and unlocking, which is suitable for scenarios requiring multi-angle conversion.

In the specific embodiment, a side of the connecting portion 12 away from the mounting portion 14 is provided with a mounting groove 122, the first magnetic member 124 is embedded inside a bottom of the mounting groove 122, and the movable portion 126 is movably arranged on an inner side wall of the mounting groove 122; the movable portion 126 is capable of approaching or moving away from a central axis of the mounting groove 122, the first position is a position away from the central axis, and the second position is a position approaching the central axis; and the engagement path where the connecting member 20 is engaged with the connecting portion 12 is parallel to the central axis; a side of the connecting member 20 facing the connecting portion 12 is provided with a mounting protrusion 22, and a side of the connecting member 20 away from the connecting portion 12 is provided with the locking position 26 and the unlocking position 27.

When the connecting member 20 and the connecting portion 12 are engaged along the engagement path, the mounting protrusion 22 presses against the movable portion 126 and drives the movable portion 126 to switch from the second position to the first position; when the mounting protrusion 22 is fully adapted to the mounting groove 122, the connecting member 20 and the connecting portion 12 are engaged in place, and the movable portion 126 is switched from the first position to the second position under the magnetic force of the first magnetic member 124, and is accommodated in the locking portion 26.

In embodiments of the present application, the bottom of the mounting groove 122 is provided with a geometric center, and the holder body 10 includes at least a pair of first magnetic members 124, and the pair of first magnetic members 124 are symmetrically arranged about the geometric center; the holder body 10 includes at least a pair of movable portions 126, and two movable portions 126 of the pair of movable portions 126 are arranged opposite to each other and are respectively arranged at two sides of the central axis; and the pair of first magnetic members 124 are configured for synchronously acting on the pair of movable portions 126.

In the embodiment of the present application, the preferred holder body 10 includes two pairs of first magnetic members 124, an angle between the connection line of one pair of first magnetic members 124 and the connection line of another pair of first magnetic members 124 is 90°; the holder body 10 includes two pairs of movable members 126, an angle between the connection line of one pair of movable members 126 and the connection line of the another pair of movable members 126 is 90°. Two pairs of first magnetic members 124 and two pairs of movable members 126 are configured for engaging the connecting portion 12 at different angles 90° apart from the holder body 10.

Accordingly, the preferred connecting member 20 is provided with two pairs of locking portions 26 and two pairs of unlocking portions 27, an angle between the connection line of one pair of locking portions 26 and the connection line of the another pair of locking portions 26 is 90°; and an angle between the connection line of one pair of unlocking portions 27 and the connection line of the another pair of unlocking portions 27 is 90°. The two pairs of locking portions 26 and the two pairs of unlocking portions 27 are arranged alternately along the circumferential direction of the connecting member 20, and the adjacent locking portions 26 and unlocking portions 27 are smoothly connected; and one pair of locking portions 26 are configured for simultaneously accommodating one pair of movable members 126, and one pair of unlocking portions 27 are configured for synchronously driving one pair of movable members 126 to switch from the second position to the first position.

In other embodiments, the first magnetic member 124 can be arranged at the geometric center of the bottom surface of the mounting groove 122, or the first magnetic member 124 can be annular in whole and arranged around the geometric center.

In the embodiments of the present application, at least a pair of second magnetic members 24 are provided inside the connecting member 20, the pair of second magnetic members 24 are arranged opposite to the pair of first magnetic members 124 along the engagement path, and the second magnetic members 24 are configured for magnetically attracting with the first magnetic members 124.

Compared with the traditional magnetic holder, in the holder assembly provided in the present application, even if the magnetic function of the first magnetic members 124 and the second magnetic members 24 fails due to extreme working conditions, since the movable member 126 is engaged into the locking portion, the damage caused by falling of the electronic device can be avoided.

In the embodiment, the first magnetic member 124 is a magnet, and the movable member 126 is an iron member or a steel member. The second magnetic member 24 can be a magnet, or it can be an iron member or a steel member. The first magnetic members 124 and the second magnetic members 24 are provided with four that are arranged at intervals, that is, the first magnetic members 124 and the second magnetic members 24 are respectively provided with two pairs, so that the electronic device can be placed vertically or horizontally. It should be noted that the positions of the first magnetic member 124 and the second magnetic member 24 are arranged corresponding to each other, and the positions of the first magnetic member 124 and the movable member 126 are arranged corresponding to each other.

Figure 3:
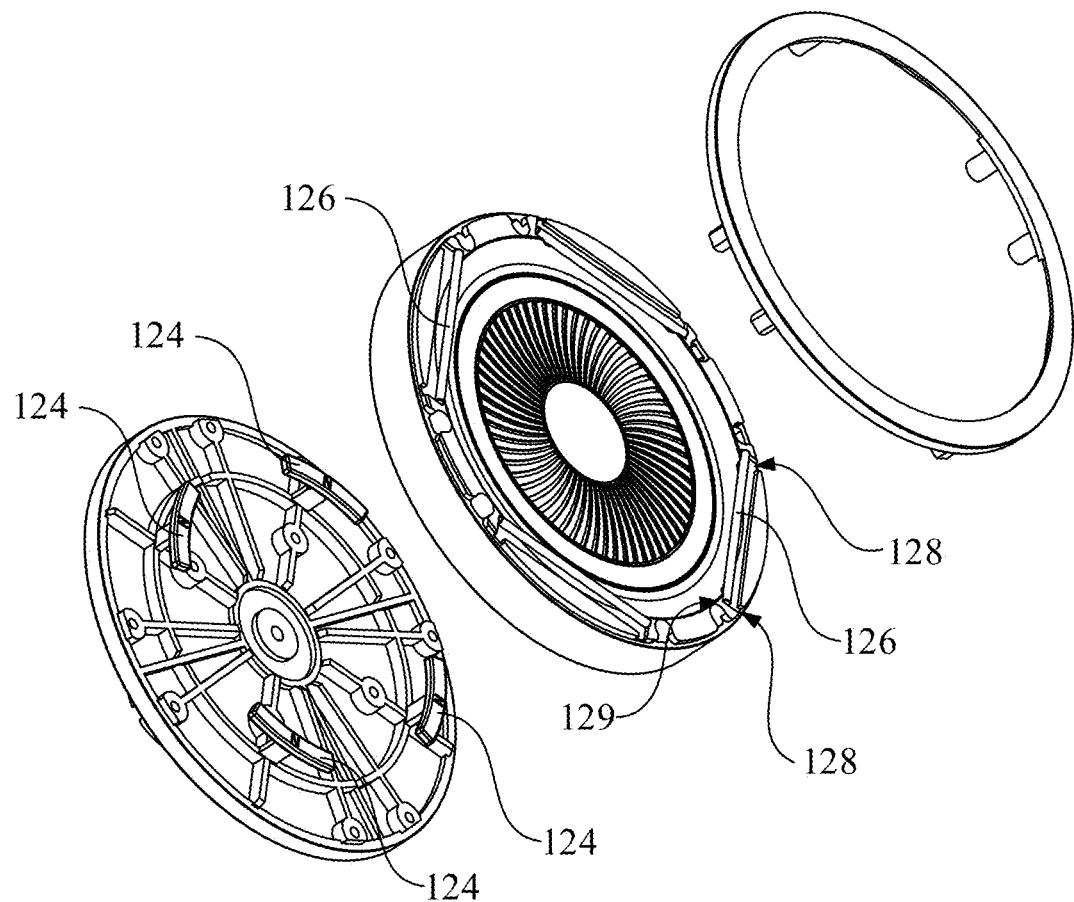
FIG. 3 is an explosive schematic view of a holder body provided by an embodiment of the present application.

In the embodiments of the present application, the inner side wall of the mounting groove 122 is provided with two sliding grooves 128, that is, a first sliding groove and a second sliding groove. The first sliding groove and the second sliding groove are arranged at intervals along the circumferential direction of the inner side wall, and the first sliding groove and the second sliding groove are respectively provided with a depth along a thickness direction of a side wall of the mounting groove 122, the first sliding groove and the second sliding groove are configured for slidingly mounting two ends of the movable portion 126; and when the movable member 126 slides relative to the first sliding groove and the second sliding groove, the movable member 126 approaches or moves away from the central axis. As shown in FIG. 3, the sliding grooves 128 are respectively provided with a stop block 129 adjacent to one end of the central axis of the mounting groove 122 to prevent the movable member 126 from escaping the sliding grooves 128.

In the embodiment of the present application, along a direction from the connecting member 20 towards to the connecting portion 12, an outer side wall of the mounting protrusion 22 is a conical surface gradually approaching to the central axis, and the inner side wall of the mounting groove 122 is a conical surface gradually approaching to the central axis; so that the mounting protrusion 22 can be more smoothly engaged into the mounting groove 122, and it is easy for the mounting protrusion 22 to provide pressure force to the movable member 126.

Figure 4:
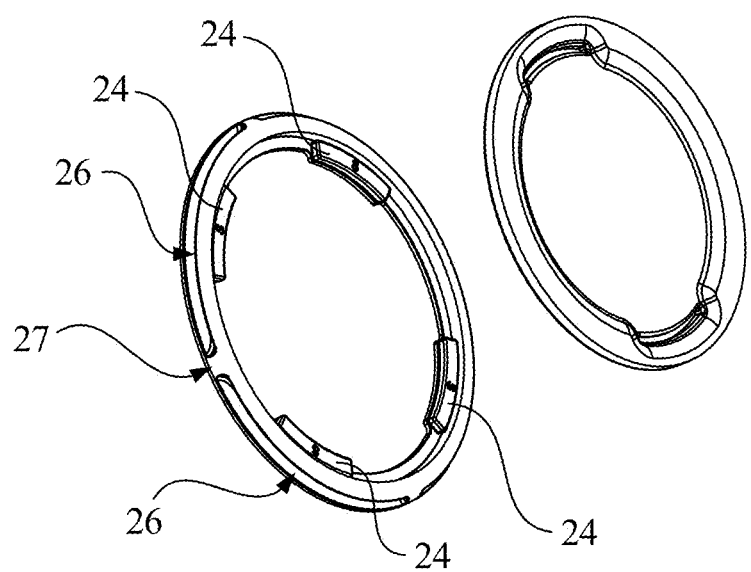
FIG. 4 is an explosive schematic view of a connecting member provided by an embodiment of the present application.
Figure 5:
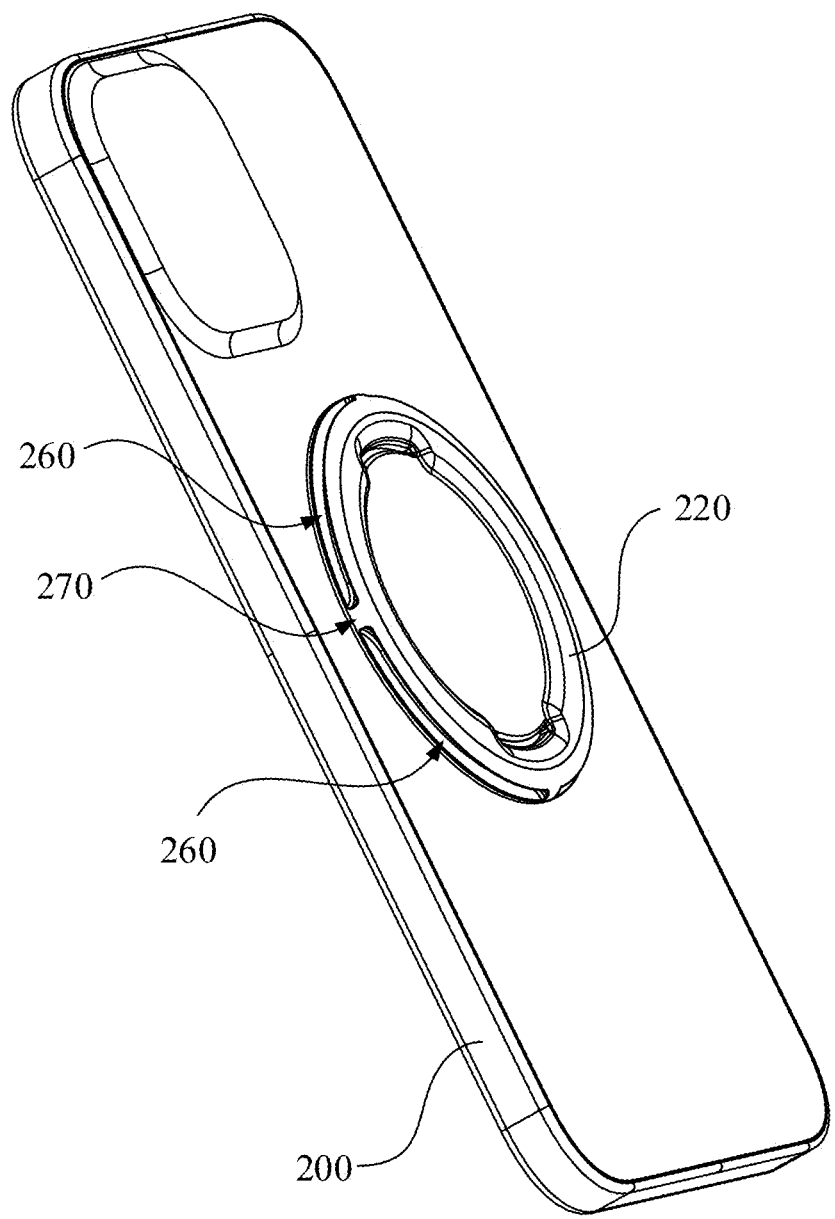
FIG. 5 is a structural schematic view of a connecting member provided by an embodiment of the present application.
Figure 6:
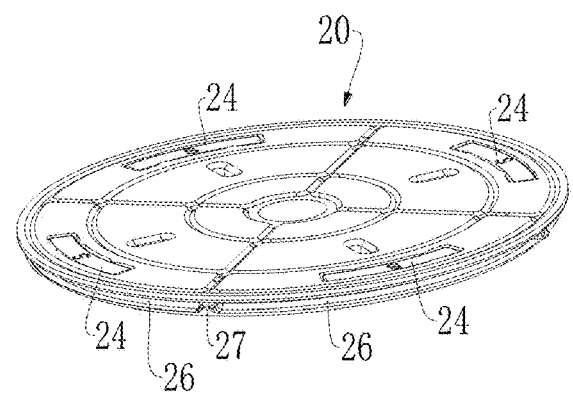
FIG. 6 is a schematic view of a holder assembly provided by an embodiment of the present application.
Figure 6:
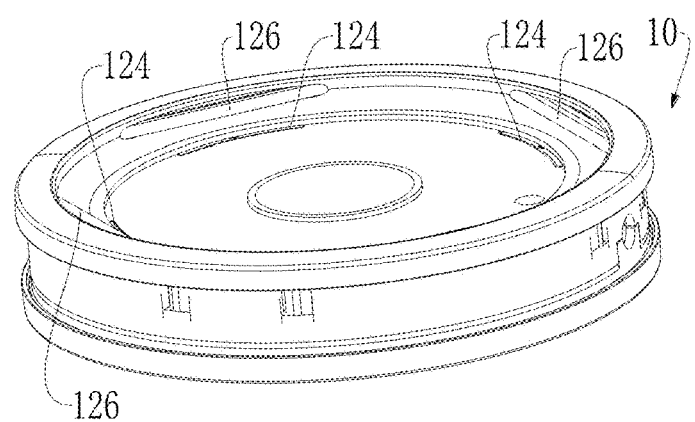
Figure 7:
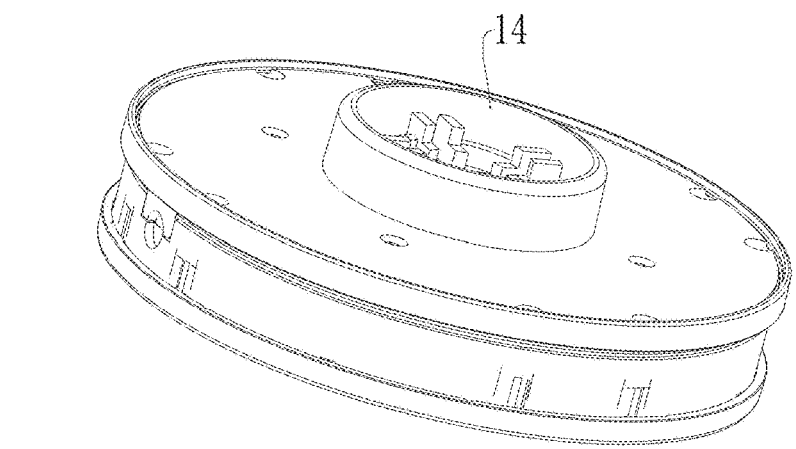
FIG. 7 is a schematic view of a holder assembly provided by an embodiment of the present application; where the views in FIG. 6 and FIG. 7 are in opposite directions.
Figure 7:
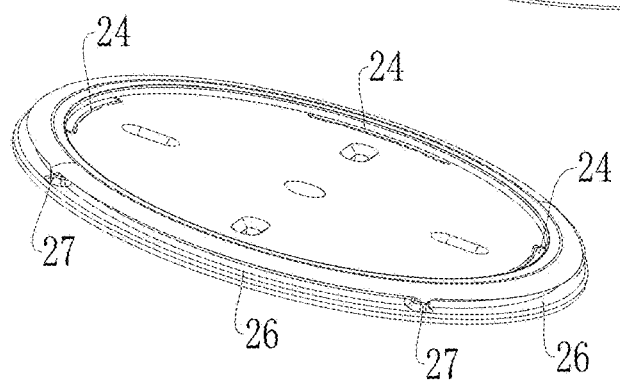
Figure 8:
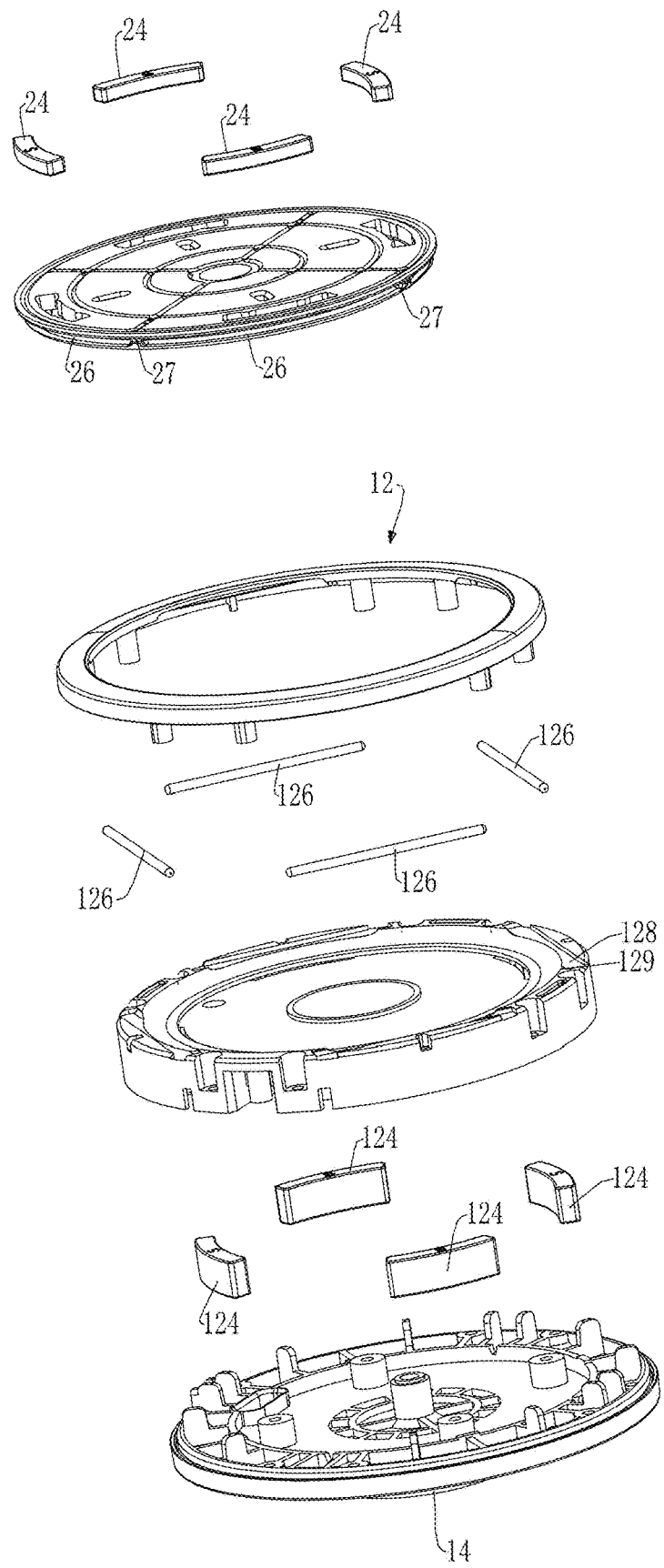
FIG. 8 is an explosive schematic view of a holder assembly provided by an embodiment of the present application.
Figure 9:
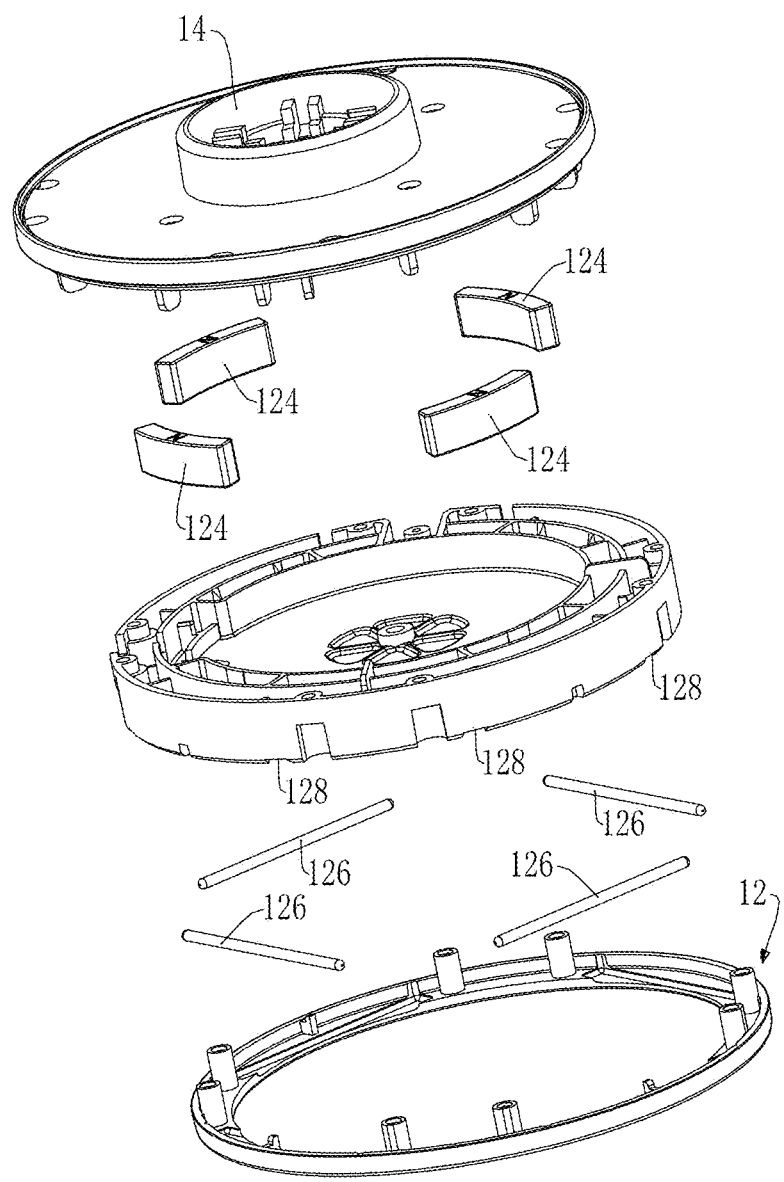
FIG. 9 is an explosive schematic view of a holder assembly provided by an embodiment of the present application; where the views in FIG. 8 and FIG. 9 are in opposite directions.
Figure 9:
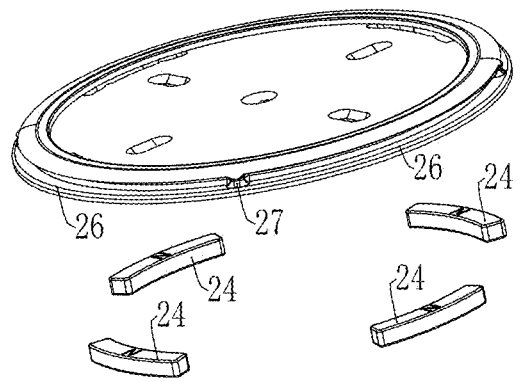
Figure 10:
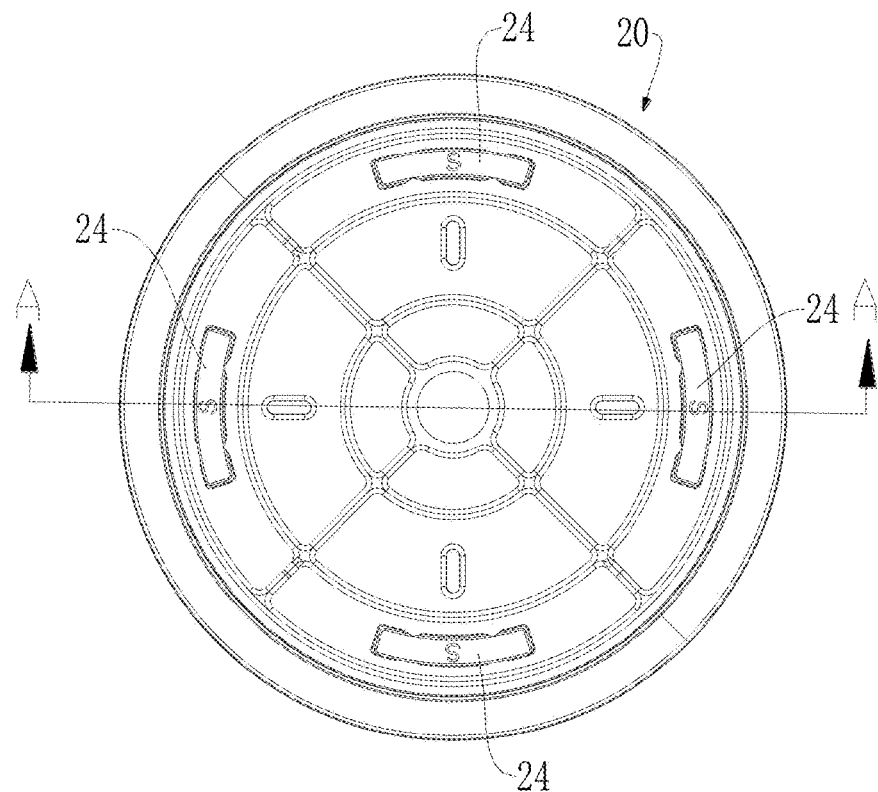
FIG. 10 is an assembly view of a holder assembly provided by an embodiment of the present application.
Figure 11:
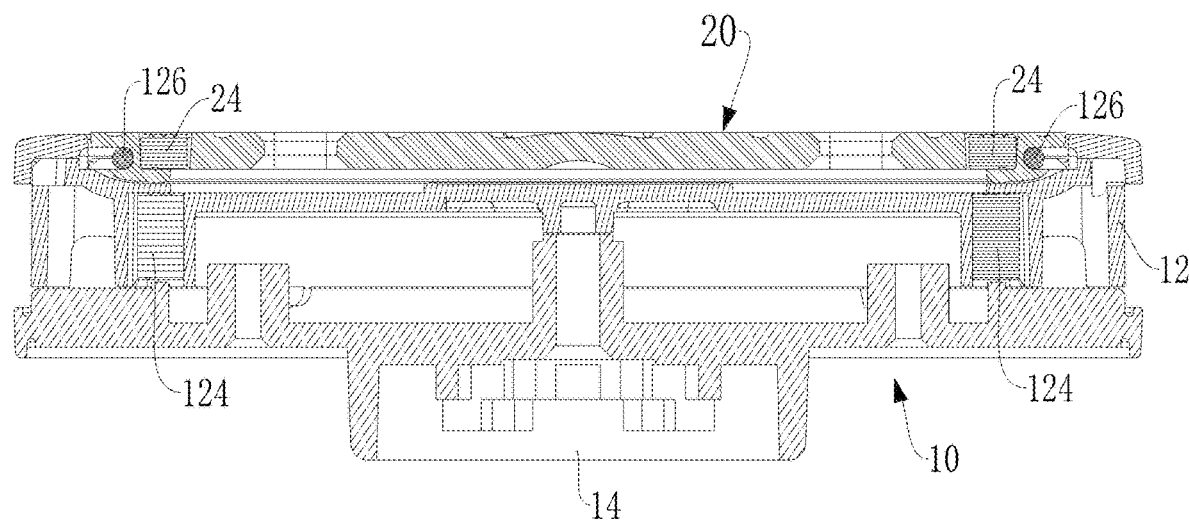
FIG. 11 is a cross-sectional view along an A-A direction in FIG. 10.

As shown in FIGS. 4 and 5, a further object of the embodiment of the present application is to provide a connecting member, one end of the connecting member is configured for connecting an electronic device; the other end of the connecting member opposite to the end is provided with a mounting protrusion 220; circumferential surfaces of the end and the other end of the connecting member are respectively provided with a locking portion 260 and an unlocking portion 270, and the locking portion 260 and the unlocking portion 270 are successively arranged along a circumferential direction of the connecting member and are smoothly connected to each other; the locking portion includes an internal concave structure recessed by a part of a circumferential surface of the connecting member toward a center of the connecting member, and the unlocking portion 270 includes other part of the circumferential surface of the connecting member.

After the connecting member is engaged to the connecting portion, the connecting member can be rotated relative to the connecting portion, and the connecting member is provided with a locking position and an unlocking position; when the connecting member is in the locking position, the connecting member can be rotated within the preset angle relative to the connecting portion, and when the connecting member is in the unlocked position, the connecting member is detached from the connection portion.

When the movable member 126 switches from the first position to the second position under the magnetic force of the first magnetic member 24, the movable member 126 is accommodated in the locking portion 260, and the connecting member is in the locking position; when the connecting member rotates relative to the connecting portion and exceeds the preset angle, the unlocking portion 270 presses against the first magnetic member along the circumferential direction of the connecting member, and drives the movable member to switch from the second position to the first position, and then is detached from the locking portion 260, and the connecting member is in the unlocking position; the engagement path where the connecting member is engaged with the connecting portion is perpendicular to the circumferential direction of the connecting member.

In the embodiment of the present application, the connecting member is provided with at least a pair of locking portions 260 and at least a pair of unlocking portions 270, two locking portions 260 of the pair of locking portions 260 are arranged opposite to each other and are respectively arranged at two sides of the engagement path, and two unlocking portions 270 of the pair of unlocking portions 270 are arranged opposite to each other and are respectively arranged at two sides of the engagement path; the locking portions 260 and the unlocking portions 270 are alternately arranged along the circumferential direction of the connecting member, and adjacent locking portion 260 and the unlocking portion 270 are smoothly connected; and an extension length of the locking portion 260 is greater than an extension length of the unlocking portion 270 along a circumferential direction of the connecting member. The plurality of pairs of movable members, locking portions 260 and unlocking portions 270 can help users achieve multi-angle locking and unlocking, which is suitable for scenarios requiring multi-angle conversion.

In the embodiment of the present application, the mounting protrusion 220 is a ring structure, and an outer side wall of the mounting protrusion 220 is a conical surface gradually approaching to a central axis of the mounting protrusion 220 in a direction from the end towards the other end, so as to facilitate the mounting protrusion 220 to be more smoothly engaged inside the mounting groove and to facilitate the mounting protrusion 220 to provide pressure force to the movable member.

As shown in FIG. 5, in an embodiment, the connecting member further includes a protective shell 200 for being sleeved onto the electronic device, and the protective shell 200 is arranged on the end. In the embodiment, the connecting member itself contains the protective shell 200, and the connecting member can be connected directly to the electronic device.

As shown in FIG. 4, in an embodiment, the end of the connecting member is coated with an adhesive layer 28, and the adhesive layer 28 is configured for bonding a shell of the electronic device or a protective shell 200 of the electronic device. In the embodiment, the connecting member does not include the protective shell 200, and the connecting member is a separate component that can be directly connected to the shell of the electronic device or the protective shell 200 of the electronic device.

The above are only optionally embodiments of the present application and are not intended to limit the present application, and any modification, equivalent substitution, improvement, etc. made within the spirit and principles of the present application shall be covered by the protection scope of the present application.

What is claimed is:

1. A holder assembly, comprising:
a holder body, configured for fixing to a first component; and
a connecting member, configured for fixing to a second component;
wherein the holder body comprises: a connecting portion, a mounting portion, and a movable member; at least part of the movable member is movable relative to the connecting portion, the mounting portion is configured for fixedly connecting the first component, the connecting portion is connected with the mounting portion, and the connecting portion is configured for engaging with the connecting member, so as to connect the first component with the second component;
the at least part of the movable member is provided with a first position and a second position, the at least part of the movable member is capable of being switched between the first position and the second position, and the at least part of the movable member always has a tendency to switch from the first position to the second position;
wherein the first position avoids an engagement path where the connecting member is engaged with the connecting portion, and the second position is in the engagement path where the connecting member is engaged with the connecting portion; when the connecting member is engaged with the connecting portion along the engagement path, the connecting member presses against the at least part of the movable member and drives the at least part of the movable member to switch from the second position to the first position; and when the connecting member and the connecting portion are engaged in place, the at least part of the movable member is switched from the first position to the second position, so as to prevent the connecting member from being detached from the connecting portion in a direction opposite to the engagement path.

2. The holder assembly according to claim 1, wherein the holder assembly further comprises a first magnetic member fixed relative to the connecting portion, the movable portion and the first magnetic member are magnetically attracted, and all of the movable portion always has the tendency to switch from the first position to the second position under a magnetic force of the first magnetic member.

3. The holder assembly according to claim 1, wherein the movable member is provided with an elastic portion, and the elastic portion always has a deformation from the first position to the second position, and then has the tendency to switch from the first position to the second position.

4. The holder assembly according to claim 2, wherein the connecting member is provided with a locking portion and an unlocking portion, and the locking portion and the unlocking portion are successively arranged along a circumferential direction and are smoothly connected to each other; the locking portion comprises an internal concave structure that is recessed from a part of a circumferential surface of the connecting member to a center of the connecting member, and the unlocking portion comprises other part of the circumferential surface of the connecting member;
the connecting member is capable of rotating relative to the connecting portion, and the connecting member is provided with a locking position and an unlocking position; when the connecting member is in the locking position, the connecting member is capable of rotating relative to the connecting portion within a preset angel, and when the connecting member is in the unlocking position, the connecting member is detached from the connecting portion;

when the movable potion is switched from the first position to the second position under the magnetic force of the first magnetic member, the movable portion is accommodated in the locking portion, and the connecting member is in the locking position;

when the connecting member rotates relative to the connecting portion and exceeds the preset angle, the unlocking portion presses against the first magnetic member along the circumferential direction of the connecting member, and drives the movable member to switch from the second position to the first position, so as to be detached from the locking portion, and the connecting member is in the unlocking position; and wherein the engagement path where the connecting member is engaged with the connecting portion is perpendicular to the circumferential direction of the connecting member.

5. The holder assembly according to claim 2, wherein the holder assembly comprises at least a pair of movable portions, and two movable portions of the pair of movable portions are arranged opposite to each other and are respectively arranged at two sides of the engagement path; the connecting member is provided with at least a pair of locking portions and at least a pair of unlocking portions, two locking portions of the pair of locking portions are arranged opposite to each other and are respectively arranged at two sides of the engagement path, and two unlocking portions of the pair of unlocking portions are arranged opposite to each other and are respectively arranged at two sides of the engagement path; the locking portions and the unlocking portions are alternately arranged along the circumferential direction of the connecting member, and adjacent locking portion and the unlocking portion are smoothly connected; and wherein the pair of locking portions are configured for synchronously accommodating the pair of movable portions, and the pair of unlocking portions are configured for synchronously driving the pair of movable portions to switch from the second position to the first position.

6. The holder assembly according to claim 4, wherein an extension length of the locking portion is greater than an extension length of the movable portion along a circumferential direction of the connecting member, so that when the connecting member is in the locking position, the connecting member is rotated relative to the connecting portion within the preset angle.

7. The holder assembly according to claim 4, wherein a side of the connecting portion away from the mounting portion is provided with a mounting groove, the first magnetic member is embedded inside a bottom of the mounting groove, and the movable portion is movably arranged on an inner side wall of the mounting groove; the movable portion is capable of approaching or moving away from a central axis of the mounting groove, the first position is a position away from the central axis, and the second position is a position approaching the central axis; and the engagement path where the connecting member is engaged with the connecting portion is parallel to the central axis;

a side of the connecting member facing the connecting portion is provided with a mounting protrusion, and a side of the connecting member away from the connecting portion is provided with the locking position and the unlocking position; and when the connecting member and the connecting portion are engaged along the engagement path, the mounting protrusion presses against the movable portion and drives the movable portion to switch from the second position to the first position; when the mounting protrusion is fully adapted to the mounting groove, the connecting member and the connecting portion are engaged in place, and the movable portion is switched from the first position to the second position under the magnetic force of the first magnetic member, and is accommodated in the locking portion.

8. The holder assembly according to claim 7, wherein the bottom of the mounting groove is provided with a geometric center, and the holder body comprises at least a pair of first magnetic members, and the pair of first magnetic members are symmetrically arranged about the geometric center; the holder body comprises at least a pair of movable portions, and two movable portions of the pair of movable portions are arranged opposite to each other and are respectively arranged at two sides of the central axis; and wherein the pair of first magnetic members are configured for synchronously acting on the pair of movable portions.

9. The holder assembly according to claim 8, wherein the holder body comprises two pairs of the first magnetic members, and an angle between a connection line of one pair of first magnetic members and a connection line of another one pair of first magnetic members is 90°; the holder body comprises two pairs of the movable portions, and an angle between a connection line of one pair of movable portions and a connection line of another one pair of movable portions is 90°; and the two pairs of the first magnetic members and two pairs of the movable members are configured for engaging the connecting portion at different angles 90° apart from the holder body.

10. The holder assembly according to claim 8, wherein at least a pair of second magnetic members are provided inside the connecting member, the pair of second magnetic members are arranged opposite to the pair of first magnetic members along the engagement path, and the second magnetic members are configured for magnetically attracting with the first magnetic members.

11. The holder assembly according to claim 7, wherein the inner side wall of the inner side wall of the mounting groove is provided with a first sliding groove and a second sliding groove, and the first sliding groove and the second sliding groove are arranged at intervals along a circumferential direction of the inner side wall of the mounting groove;

the first sliding groove and the second sliding groove are respectively provided with a depth along a thickness direction of a side wall of the mounting groove, the first sliding groove and the second sliding groove are configured for slidingly mounting two ends of the movable portion; and when the movable member slides relative to the first sliding groove and the second sliding groove, the movable member approaches or moves away from the central axis.

12. The holder assembly according to claim 11, wherein along a direction from the connecting member towards to the connecting portion, an outer side wall of the mounting protrusion is a conical surface gradually approaching to the central axis, and the inner side wall of the mounting groove is a conical surface gradually approaching to the central axis.

13. A connecting member, wherein an end of the connecting member is configured for connecting an electronic device, and the other end of the connecting member opposite to the end is provided with a mounting protrusion; and circumferential surfaces of the end and the other end of the connecting member are respectively provided with a locking portion and an unlocking portion, and the locking portion and the unlocking portion are successively arranged along a circumferential direction of the connecting member and are smoothly connected to each other; the locking portion comprises an internal concave structure recessed by a part of a circumferential surface of the connecting member toward a center of the connecting member, and the unlocking portion comprises other part of the circumferential surface of the connecting member.

14. The connecting member according to claim 13, wherein the connecting member is provided with at least a pair of locking portions and at least a pair of unlocking portions, two locking portions of the pair of locking portions are arranged opposite to each other and are respectively arranged at two sides of the engagement path, and two unlocking portions of the pair of unlocking portions are arranged opposite to each other and are respectively arranged at two sides of the engagement path; the locking portions and the unlocking portions are alternately arranged along the circumferential direction of the connecting member, and adjacent locking portion and the unlocking portion are smoothly connected; and
   an extension length of the locking portion is greater than an extension length of the unlocking portion along a circumferential direction of the connecting member.

15. The connecting member according to claim 13, wherein the mounting protrusion is a ring structure, and an outer side wall of the mounting protrusion is a conical surface gradually approaching to a central axis of the mounting protrusion in a direction from the end towards the other end.

16. The connecting member according to claims 13, wherein the connecting member further comprises a protective shell for being sleeved onto the electronic device, and the protective shell is arranged on the end.

17. The connecting member according to claims 13, wherein the end of the connecting member is coated with an adhesive layer, and the adhesive layer is configured for bonding a shell of the electronic device or a protective shell of the electronic device.

18. The connecting member according to claim 14, wherein the connecting member further comprises a protective shell for being sleeved onto the electronic device, and the protective shell is arranged on the end.

19. The connecting member according to claim 15, wherein the connecting member further comprises a protective shell for being sleeved onto the electronic device, and the protective shell is arranged on the end.

20. The connecting member according to claim 14, wherein the end of the connecting member is coated with an adhesive layer, and the adhesive layer is configured for bonding a shell of the electronic device or a protective shell of the electronic device.

* * * * *